(12) United States Patent
Matsuo et al.

(10) Patent No.: US 12,187,295 B2
(45) Date of Patent: Jan. 7, 2025

(54) VEHICLE MEASURING DEVICE UNIT AND METHOD OF GENERATING INTEGRATED DATA IN VEHICLE MEASURING DEVICE UNIT

(71) Applicant: DENSO CORPORATION, Kariya (JP)

(72) Inventors: Hirotaka Matsuo, Kariya (JP); Wencheng Lin, Kariya (JP)

(73) Assignee: DENSO CORPORATION, Kariya (JP)

( * ) Notice: Subject to any disclaimer, the term of this patent is extended or adjusted under 35 U.S.C. 154(b) by 269 days.

(21) Appl. No.: 17/663,474

(22) Filed: May 16, 2022

(65) Prior Publication Data

US 2022/0274606 A1 Sep. 1, 2022

Related U.S. Application Data

(63) Continuation of application No. PCT/JP2020/040239, filed on Oct. 27, 2020.

(30) Foreign Application Priority Data

Nov. 18, 2019 (JP) .................. 2019-207578

(51) Int. Cl.
*G08G 1/01* (2006.01)
*B60W 50/00* (2006.01)
*G07C 5/02* (2006.01)
*G08G 1/16* (2006.01)

(52) U.S. Cl.
CPC ............... *B60W 50/00* (2013.01); *G07C 5/02* (2013.01); *B60W 2420/403* (2013.01); *B60W 2420/408* (2024.01); *B60W 2556/35* (2020.02); *G08G 1/16* (2013.01)

(58) Field of Classification Search
CPC .......... B60W 50/00; B60W 2420/403; B60W 2420/408; B60W 2556/35; G07C 5/02; G08G 1/16; G08G 1/166; B60R 11/02; G01S 13/86; G01S 13/931; G01V 11/00; G08C 15/06; G08C 19/00
See application file for complete search history.

(56) References Cited

U.S. PATENT DOCUMENTS

| | | | | |
|---|---|---|---|---|
| 9,201,421 | B1 * | 12/2015 | Fairfield | B60W 40/04 |
| 10,175,340 | B1 * | 1/2019 | Abari | G01S 7/006 |
| 11,037,000 | B2 * | 6/2021 | Agrawal | G06V 10/25 |
| 11,283,877 | B2 * | 3/2022 | Kentley-Klay | B60Q 1/549 |

(Continued)

FOREIGN PATENT DOCUMENTS

| | | |
|---|---|---|
| JP | 2008-205594 A | 9/2008 |
| JP | 2012-245812 A | 12/2012 |
| JP | 2017-058385 A | 3/2017 |

*Primary Examiner* — Toan N Pham
(74) *Attorney, Agent, or Firm* — MASCHOFF BRENNAN

(57) ABSTRACT

In a vehicle measuring device unit, a data processing device includes a plurality of input parts each connected to a different one of the plurality of detectors, an output part connected to a control device provided in a vehicle, and an integrated data generation part that generates integrated data using detection data input from the plurality of detectors via the plurality of input parts and outputs the generated integrated data via the output part. The number of wires connecting the control device with the integrated data generation part is smaller than the number of wires connecting the integrated data generation part with the plurality of detectors.

9 Claims, 8 Drawing Sheets

(56) References Cited

U.S. PATENT DOCUMENTS

| | | | |
|---|---|---|---|
| 2010/0106356 A1* | 4/2010 | Trepagnier | G01S 17/86 |
| | | | 701/25 |
| 2017/0305360 A1 | 10/2017 | Zajac | |
| 2018/0272963 A1 | 9/2018 | Meyhofer et al. | |

* cited by examiner

| | | FRONT DETECTOR | RIGHT DETECTOR | LEFT DETECTOR | REAR DETECTOR |
|---|---|---|---|---|---|
| WITHOUT PRIORITIES | | 25% | 25% | 25% | 25% |
| WITH PRIORITIES | FORWARD MOVEMENT | 40% | 20% | 20% | 20% |
| | RIGHT TURN | 30% | 40% | 10% | 20% |
| | LEFT TURN | 30% | 10% | 40% | 20% |
| | BACKWARD MOVEMENT | 5% | 30% | 30% | 35% |
| | CHANGE LANES (TO THE RIGHT) | 25% | 35% | 5% | 35% |
| | CHANGE LANES (TO THE LEFT) | 25% | 5% | 35% | 35% |

VEHICLE ROOF | INSIDE VEHICLE

|  | CAMERA | LIDAR | MILLIMETER WAVE |
|---|---|---|---|
| DAYTIME (1000 lux OR HIGHER) | 60% | 35% | 5% |
| EVENING (LOWER THAN 100 lux) | 55% | 40% | 5% |
| NIGHTTIME (LOWER THAN 10 lux) | 45% | 45% | 10% |
| NIGHTTIME (LOWER THAN 1 lux) | 40% | 50% | 10% |

FIG.13

| | CAMERA | LIDAR | MILLIMETER WAVE |
|---|---|---|---|
| SUNNY | 60% | 35% | 5% |
| RAINY (LOWER THAN 1 mm/h) | 60% | 35% | 5% |
| RAINY (1 mm/h OR HIGHER AND LOWER THAN 15 mm/h) | 55% | 35% | 10% |
| RAINY (15 mm/h OR HIGHER) | 50% | 30% | 20% |
| FOGGY | 50% | 30% | 20% |
| SNOWY | 55% | 35% | 10% |

FIG.14

| | | CAMERA | LIDAR | MILLIMETER WAVE |
|---|---|---|---|---|
| SUNNY | DAYTIME | 60% | 35% | 5% |
| | NIGHTTIME | 45% | 45% | 10% |
| RAINY (15 mm/h OR LOWER) | DAYTIME | 55% | 35% | 10% |
| | NIGHTTIME | 42% | 45% | 13% |

VEHICLE MEASURING DEVICE UNIT AND METHOD OF GENERATING INTEGRATED DATA IN VEHICLE MEASURING DEVICE UNIT

CROSS-REFERENCE TO RELATED APPLICATION

This application is a continuation application of International Application No. PCT/JP2020/040239 filed Oct. 27, 2020 which designated the U.S. and claims priority to Japanese Patent Application No. 2019-207578 filed on Nov. 18, 2019, the contents of each of which are incorporated herein by reference.

BACKGROUND

Technical Field

The present disclosure relates to a measuring device unit for a vehicle.

Related Art

A plurality of sensors are used in a driving support system. A technique has been proposed in which a plurality of sensors are integrated and mounted on a vehicle.

BRIEF DESCRIPTION OF THE DRAWINGS

In the accompanying drawings:

FIG. 13 is an explanatory diagram showing an example of a priority table used to determine priorities according to the weather environment;

FIG. 14 is an explanatory diagram showing an example of a priority table used to determine priorities according to the brightness environment and the weather environment;

DESCRIPTION OF SPECIFIC EMBODIMENTS

In the above proposed technique as disclosed in US 2017/0305360 A1, when a large number of sensors are integrated and mounted on a vehicle as a measuring device unit, the number of wires between the sensors and the control device for a driving support system provided in the vehicle increases, which results in a complex wiring design. In addition, when the data transmitted from a large number of sensors are directly transmitted to the control device for the driving support system, the data may not be effectively utilized.

In view of the above, it is desired to have a technique for reducing the number of wires between the measuring device unit and the control device in the vehicle.

A first aspect provides a vehicle measuring device unit. The vehicle measuring device unit according to the first aspect includes a plurality of detectors, a plurality of input parts each connected to a different one of the plurality of detectors, an output part connected to a control device provided in a vehicle, and an integrated data generation part that generates integrated data using detection data input from the plurality of detectors via the plurality of input parts and outputs the generated integrated data via the output part.

According to the vehicle measuring device unit according to the first aspect, the number of wires between the measuring device unit and the control device in the vehicle can be reduced.

A second aspect provides a method of generating integrated data in a vehicle measuring device unit. The data transmission method according to the second aspect includes receiving detection data from a plurality of detectors; generating the integrated data using a plurality of the pieces of detection data; and transmitting the integrated data to a control device provided in a vehicle.

According to the method of generating integrated data in a vehicle measuring device unit according to the second aspect, the number of wires between the measuring device unit and the control device in the vehicle can be reduced. The present disclosure can also be realized as an integrated data generation program or a computer-readable recording medium on which the program is recorded.

The vehicle measuring device unit and the method of generating integrated data in the vehicle measuring device unit will be described with reference to embodiments.

First Embodiment

Figure 1:
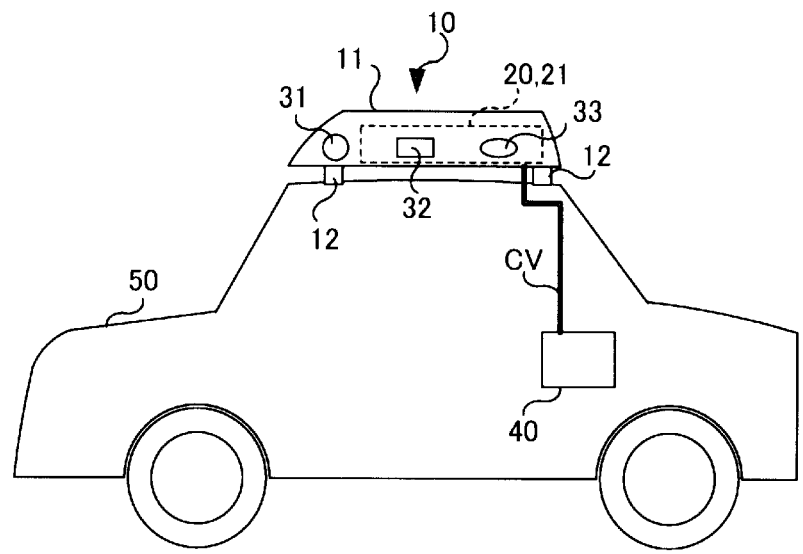
FIG. 1 is an explanatory diagram showing an example of a vehicle provided with a measuring device unit according to a first embodiment.

As shown in FIG. 1, a vehicle measuring device unit 10 according to a first embodiment is mounted on a vehicle 50.

The measuring device unit 10 suffices if it includes at least a data processing device 21 and a plurality of detection devices 31, 32, and 33 arranged around a body 20, for example, front, back, left, right, and above. The data processing device 21 is preferably housed in the body 20. The body 20 may be partially or entirely formed of a non-metal material such as resin, for example, reinforced resin or carbon fiber, or may be partially or entirely formed of a metal material such as an aluminum material or stainless steel. The body 20 may also be formed using both a metal material and a non-metal material. For example, it may be formed by combining a plurality of components, such as upper and lower housings or a box member and a lid member, using a resin or rubber sealing member between the components. The measuring device unit 10 further includes a frame (not shown) and a fixing mechanism 12 for fixing the measuring device unit 10 to the vehicle 50. The fixing mechanism 12 may be, for example, an attachment mechanism for attaching the measuring device unit 10 to the roof rails on the roof of the vehicle 50, or an attachment mechanism attached between the roof of the vehicle 50 and the upper part of a door thereof. The data processing device 21 is placed inside the body 20 having a waterproof structure. According to the measuring device unit 10 having such a configuration, the detectors 31, 32, and 33 and the body 20 can be easily installed regardless of the shape of the vehicle 50. A vehicle control device 40 is provided inside the vehicle 50. The vehicle control device 40 may be, for example, a driving support control device 40 that uses information about objects around the vehicle 50 input from the measuring device unit 10 to perform driving support such as braking support, steering support, and propulsion support. In the first embodiment, the measuring device unit 10, specifically, the data processing device 21 and the driving support control device 40 are connected by a single wire CV. The number of wires CV suffices if it is small enough with respect to the number of detectors 31, 32, and 33, and, for example, it is preferably 1/10 or less of the total number of detectors 31, 32, and 33, and even more preferably one.

Figure 2:
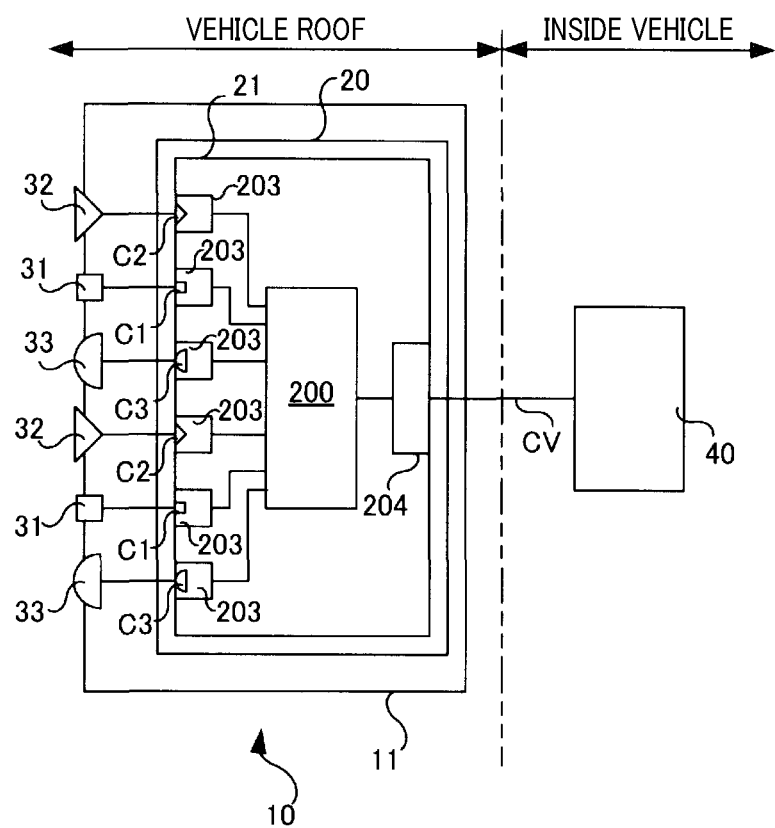
FIG. 2 is an explanatory diagram showing how the measuring device unit according to the first embodiment is connected to a driving support control device.

As shown in FIG. 2, the measuring device unit 10 according to the first embodiment includes, inside the body 20, the data processing device 21 and the plurality of detectors 31, 32, and 33. The body 20 covers the entire data processing device 21, and covers at least part of the plurality of detectors 31, 32, and 33. The data processing device 21 includes an integrated data generation part 200, a plurality of detector input parts 203, and one output part 204.

The plurality of detector input parts 203 of the data processing device 21 are each connected to a different one of the plurality of detectors 31, 32, and 33. Each detector input part 203 and each detector 31, 32, or 33 are connected via a wire, and each detector input part 203 has a plurality of connection parts C1, C2, and C3 having shapes corresponding to the shapes of the connection terminals of the wires of the detectors 31, 32, and 33, respectively. Each detector input part 203 is connected to the integrated data generation part 200 via an internal wire. Each detector input part 203 is realized by an integrated circuit such as FPGA or ASIC, and performs a protocol conversion for converting the communication protocol adopted by each of the detectors 31, 32, and 33 into the communication protocol adopted by the integrated data generation part 200. The communication protocol used for the communication between the detectors 31, 32, and 33 and the data processing device 21 may be, for example, Ethernet (registered trademark) (100M, 1G), Flat Panel Display Link (FPD-LINK), Gigabit Video Interface (GVIF), Low voltage differential signaling (LVDS) such as Gigabit Multimedia Serial Link (GMSL), or HDBASE-T. In the example of FIG. 2, a plurality of input parts 203 each having connection parts C1, C2, and C3, are shown, but a single detector input part 203 having a plurality of connection parts C1, C2, and C3 and connected to the integrated data generation part 200 via one internal wire may be used. In this case, the detector input part 203 sends the detection information detected by each of the detectors 31, 32, and 33 to the integrated data generation part 200 by multiplex communication such as frequency-division multiplexing or time-division multiplexing.

The plurality of detectors 31, 32, and 33 include a plurality of different types of detectors. In the present embodiment, the detector 31 is a camera, the detector 32 is a lidar, and the detector 33 is a radar 33, a plurality of detectors are provided for each type. Other examples of detectors are ultrasonic sensors and other sensors that use other kinds of electromagnetic waves or light. The camera 31 is an imaging device including an image sensor or an image sensor array such as a CCD(s). It receives visible light and outputs external shape information or shape information of an object as image data which is the detection result. The lidar 32 is a sensor that emits infrared laser light and receives the reflected light reflected by the target to detect the distance, relative velocity, and angle of the target with respect to the vehicle 50. The radar 33 is a sensor that emits a millimeter wave and receives the reflected wave reflected by the target to detect the distance, relative velocity, and angle of the target with respect to the vehicle 50. Each of the detectors 31, 32, and 33 may process the received light intensity or the received signal strength obtained by the detection and output detection data consisting of a detection point sequence and an image to the integrated data generation part 200, or may directly output raw data such as the received light intensity or the received signal strength obtained by the detection to the integrated data generation part 200. In the latter case, the integrated data generation part 200 performs various kinds of processing such as image correction, lossless or lossy image compression, and demosaicing. Further, the detection data output from each of the detectors 31, 32, and 33 may be provided with a time stamp.

The output part 204 of the data processing device 21 is connected to the driving support control device 40 installed in the vehicle 50 via a wire CV. The output part 204 is realized by an integrated circuit such as FPGA or ASIC. The output part 204 performs protocol conversion processing for converting the integrated data generated in the data processing device 21 into the communication protocol adopted by the driving support control device 40, and transmits the converted integrated data to the driving support control device 40. While the number of wires input to the data processing device 21 corresponds to the number of detectors 31, 32, and 33, the number of wires output from the data processing device 21 is one, which means that the number of wires between the data processing device 21 and the driving support control device 40 is reduced. The communication protocol used for communication between the data processing device 21 and the driving support control device 40 is, for example, Ethernet (10G or higher), LVDS (FPD-LINK, GVIF, GMSL), or HDBASE-T. According to the data processing device 21 included in the measuring device unit 10 according to the first embodiment, it can absorb and deal with both the hardware differences between the connection terminal shapes of the wires of the detectors 31, 32, and 33 and the software differences between the communication protocols of the detectors 31, 32, and 33. This makes it possible to provide a virtual common input part for the driving support control device 40.

Figure 3:
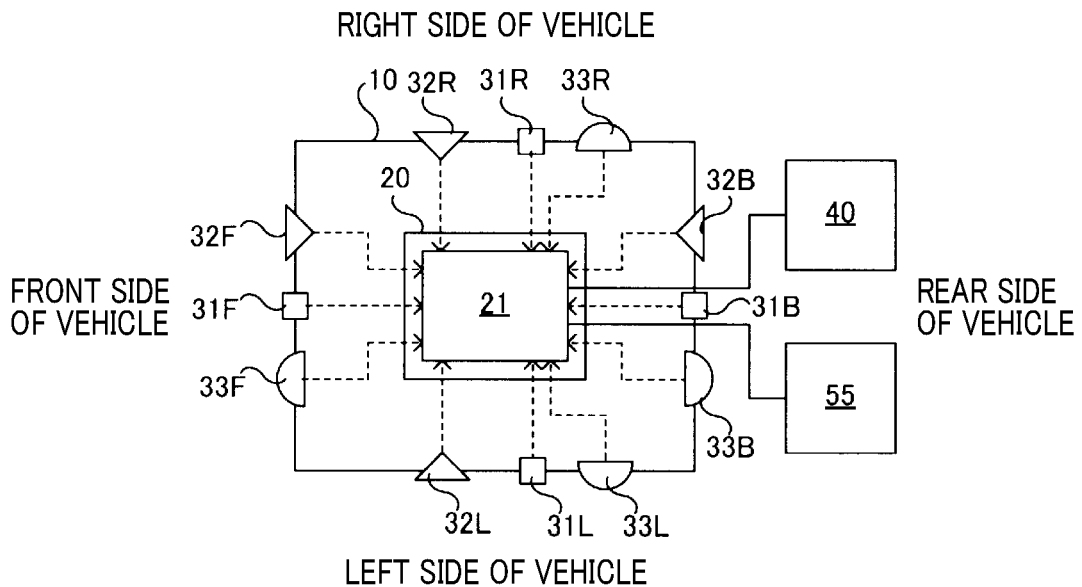
FIG. 3 is an explanatory diagram schematically showing a connection example between a data processing device according to the first embodiment and detectors.

As shown in FIG. 3, the detectors 31, 32, and 33 are arranged around the body 20, that is, around the data processing device 21. In the example of FIG. 3, front detectors 31F, 32F, and 33F on the front side of the vehicle, rear detectors 31B, 32B, and 33B on the rear side of the vehicle, right detectors 31R, 32R, and 33R on the right side of the vehicle, and left detectors 31L, 32L, and 33L on the left side of the vehicle are provided. Twelve wires are connected to the data processing device 21 from the twelve detectors. On the other hand, one wire from the driving support control device 40 and one wire from a vehicle CAN 55 are connected to the data processing device 21. The vehicle CAN 55 is a protocol for communicating detection signals and control signals between devices in the vehicle 50. In this embodiment, it is schematically shown as an information source of information obtained through the vehicle CAN 55. Information obtained through the vehicle CAN 55 includes, for example, driving information such as the vehicle speed, yaw rate, steering angle, and operation of direction indicators, and vehicle environment information such as environmental brightness, weather, and GNSS (Global Satellite Navigation System). Note that, although FIG. 3 shows an example in which three different types of detectors 31, 32, and 33 are provided to facilitate the following description, one, two, or four or more types of detectors may be used. The vehicle environment information includes data acquired by the detectors and the situation around the vehicle obtained based on the data.

Figure 4:
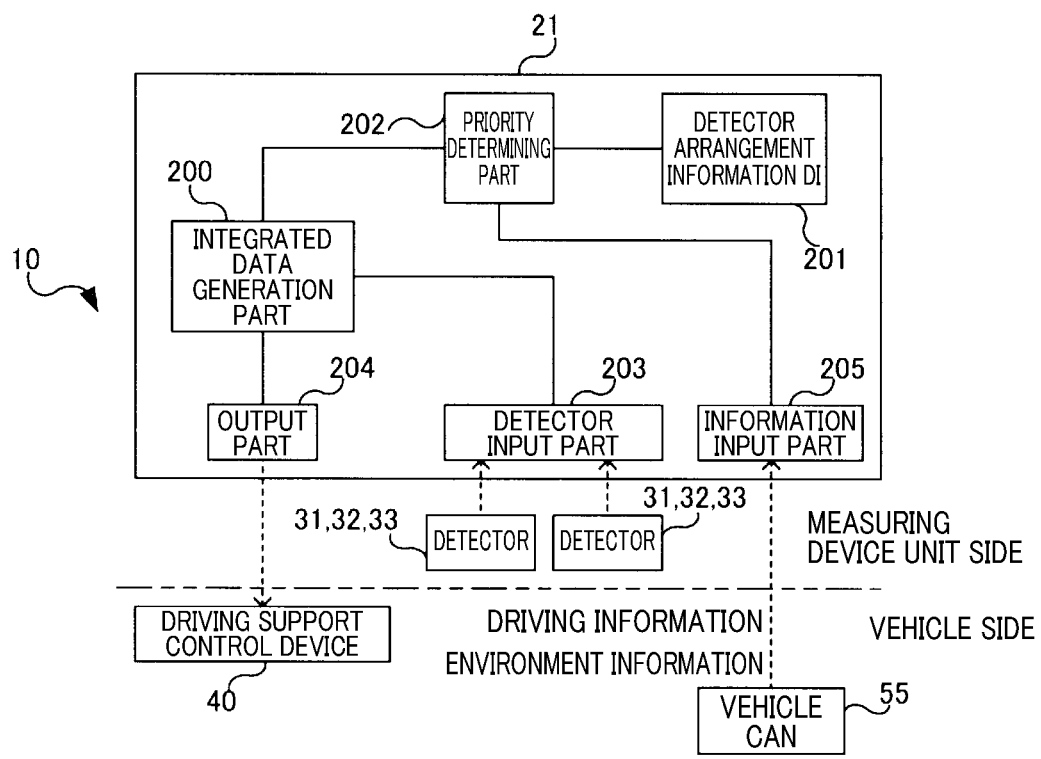
FIG. 4 is block diagram showing the functional configuration of a data processing device according to the first embodiment.

As shown in FIG. 4, the data processing device 21 includes the integrated data generation part 200, a memory 201, a priority determining part 202, the detector input part 203, the output part 204, and an information input part 205. The data processing device 21 is implemented in hardware by a pre-programmed integrated circuit such as FPGA or ASIC. The integrated data generation part 200 performs an integrated data generation process for generating integrated data to be transmitted to the vehicle control device 40 using the detection data acquired from the detectors 31, 32, and 33. At the time the integrated data is generated, the priority determining part 201 determines which of the detection data from the detectors 31, 32, and 33 should be prioritized, that is, determines the detection data to be prioritized temporally or quantitatively. The memory 202 stores detector arrangement information DI, which is information on the positions at which the detectors are arranged in a non-volatile and read-only manner. In addition, it may store a readable/writable priority determination table for determining the priorities of the detection data from the detectors 31, 32, and 33 to be transmitted the vehicle control device 40.

The plurality of detectors 31, 32, and 33 of each of the plurality of types are connected to the detector input part 203 via detection signal lines as wires. The detection data is input from the detectors 31, 32, and 33. The driving support control device 40 is connected to the output part 204 via an integrated data signal line as a wire. The integrated data is output to the driving support control device 40. The vehicle CAN 55 is connected to the information input part 205 via a wire. The driving information and the vehicle environment information are input from the vehicle CAN 55.

The driving support control device 40, via a driving support device not shown, controls the output of the internal combustion engine and/or the output of the motor according to the driver's accelerator pedal operation or independently of the driver's accelerator pedal operation, realizes braking by the braking device independently of the driver's brake pedal operation, or realizes steering by the steering device independently of the driver's steering wheel operation.

The integrated data generation processing carried out by the data processing device 21 according to the first embodiment will be described. The processing routine shown in FIG. 4 is, for example, repeated at predetermined time intervals, for example, intervals of several milliseconds from the start to the stop of the vehicle control system, or from when the start switch is turned on to when the start switch is turned off.

Figure 7:
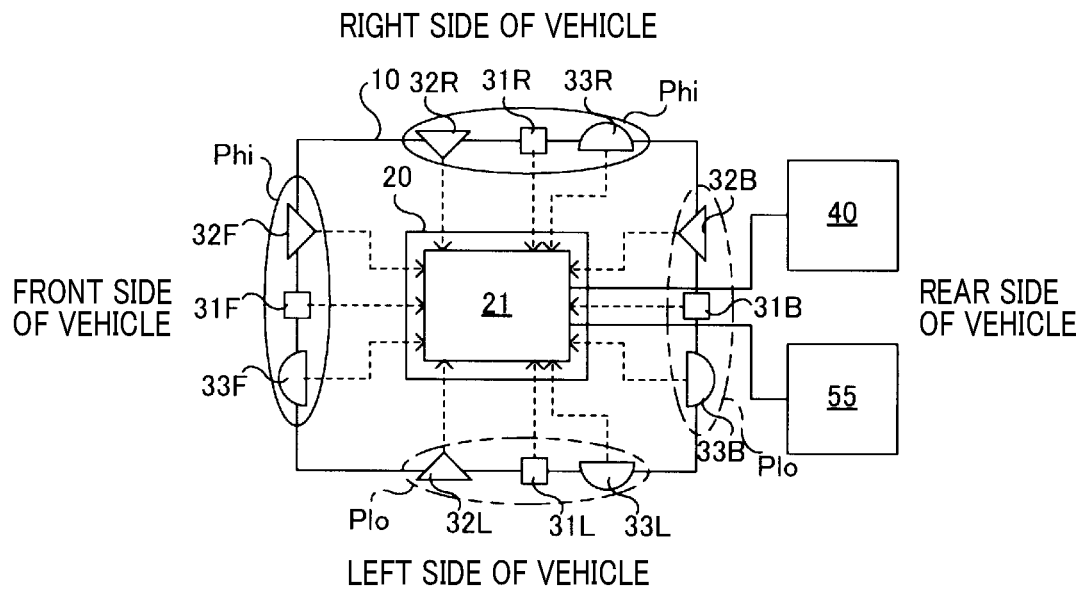
FIG. 7 is an explanatory diagram showing the concept of priorities assigned to the detectors depending on the positions of the detectors.

The integrated data generation part 200 acquires detection data from each of the detectors 31, 32, and 33 via the detector input part 203 (step S100). The priority determining part 201 acquires various information such as the driving information and vehicle environment information from the vehicle CAN 55 via the information input part 205, and also acquires the detector arrangement information DI stored in the memory 202 to determine the priorities using the various information (step S102). The priority determination is carried out by, for example, using a priority determination table shown in FIG. 6 that is provided in the priority determination part 201 or stored in the memory 202 and is based on the arrangement positions of the detectors and the driving state of the vehicle 50. The priority determination table may be dynamically updated according to the driving state of the vehicle 50. Note that high priority means that the amount of data it takes up in the integrated data is large, that is, the proportion is high, and low priority means that the amount of data it takes up in the integrated data is small, that is, the proportion is low. They can be considered as high and low weights in relative weighting. In the present embodiment, since priorities are determined according to the arrangement positions of the detectors, detectors placed at each arrangement position are treated as a group of detectors without taking into consideration the type of each detector. For example, the front detectors 31F, 32F, and 33F are treated as a group of front sensors. The data processing device 21 and the driving support control device 40 are connected by a single wire, and the upper limit of the communication band, that is, the amount of transmitted data is limited. Therefore, the priority determination table is used to determine the proportion to be allocated to the detection data from each of the detectors 31, 32, and 33 with respect to the upper limit of the communication band, that is, the maximum amount of transmitted data. In other words, their degrees of priority are determined. The term "communication band" has a similar meaning to terms such as transmission rate and transfer rate and it indicates the amount of data that can be transmitted per unit time. In general, it is determined by the amount of data that can be processed per unit time without the buffer overwriting data or discarding data on the receiving side. When the vehicle 50 turns right, as shown in FIG. 7, the priority of the front detectors 31F, 32F, and 33F and the priority of the right detectors 31R, 32R, and 33R circled with a solid line Phi, in other words, their proportions in the integrated data are increased to 30% and 40%, respectively, whereas the priority of the left detectors 31L, 32L, and 33L and the priority of the rear detectors 31B, 32B, and 33B circled with an alternate long and short dash line Plo are reduced to 10% and 20%, respectively. In a case where no priorities are assigned, an equal proportion of 25% is allocated to each of the detectors at different arrangement positions. The specific priorities shown in FIG. 6, that is, the allocated proportions are only examples. They may be appropriately determined as long as the tendency of the allocation according to the driving state of the vehicle 50 is maintained. In addition, the proportions may be adjusted using the results of machine learning or the like. For example:

Actual driving scenes include scenes that are more complicated than the above examples such as a turn crossing an oncoming lane, a right-turn light or a left-turn light in a scene where the vehicle turns right in left-hand traffic or a scene where the vehicle turns left in right-hand traffic, and an intersection with no traffic lights. Therefore, it may be further subdivided according to the current driving state and the surrounding environment including objects such as other vehicles by learning.

For example, based on factors such as sudden braking and sudden steering, the monitoring ability or abilities the driver lacks or lack may be estimated and evaluated to determine the coefficients or weights to be applied to the proportions, and thus reflected in the final proportions.

When the vehicle 50 moves forward, the priority of the front detectors 31F, 32F, and 33F is increased, but since there is a possibility that an object approaches from the rear to the side, the priorities of the detectors at other arrangement positions are determined to be the same. When the vehicle 50 turns left, the priority of the front detectors 31F, 32F, and 33F and the priority of the left detectors 31L, 32L, and 33L are increased. When the vehicle 50 moves backward, since the probability of an object approaching from the front is low, the priorities of the rear detectors 31B, 32B, and 33B, the right detectors 31R, 32R, and 33R, and the left detectors 31L, 32L, and 33L are increased, and the priority of the front detectors 31F, 32F, and 33F is greatly reduced. When the vehicle 50 moves to a lane on the left, the priorities of the left detectors 31L, 32L, and 33L and the rear detectors 31B, 32B, and 33B are increased, and the priority of the right detectors 31R, 32R, and 33R is greatly reduced. When the vehicle 50 moves to a lane on the right, the priority of the right detectors 31R, 32R, and 33R and the rear detectors 31B, 32B, and 33B are increased, and the priority of the left detectors 31L, 32L, and 33L is greatly reduced. In the present embodiment, since the priorities are determined according to the arrangement positions of the detector groups and the driving state of the vehicle, it suffices if a plurality of detectors of at least one type are arranged at different arrangement positions, and the present embodiment provides a technical effect when detectors of at least one type of the detectors 31, 32, and 33 are used.

Figure 8:
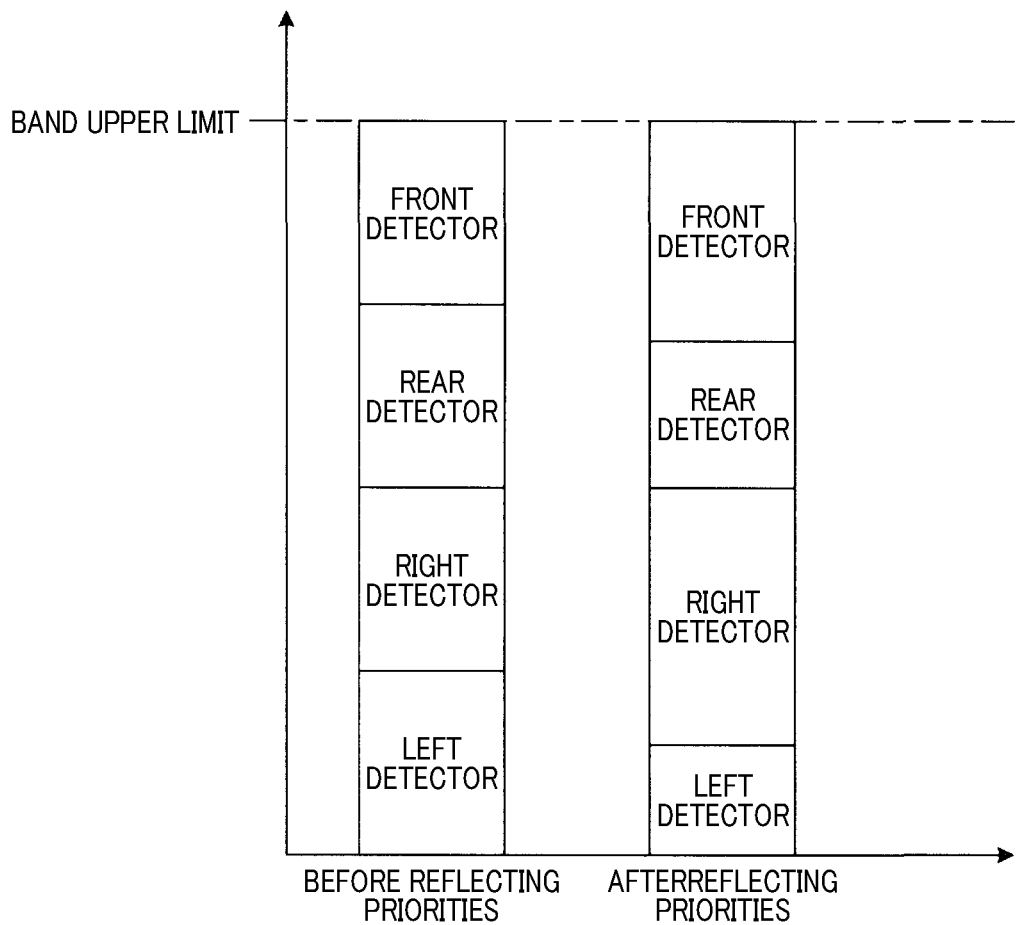
FIG. 8 is an explanatory diagram showing an example of communication band allocation in the integrated data according to priorities determined based on the positions of detectors.

The integrated data generation part 200 generates the integrated data according to the determined priorities (step S104). The generation of integrated data means determining the amount of data for transmission according to the priority, that is, allocating the total amount of transmitted data. When time-division multiplexing is adopted, the amount of data transmitted from a high priority detector is increased by increasing the number of transmissions of the detection data from each of the detectors 31, 32, and 33 according to the priority, and the amount of data transmitted from a low priority detector is relatively reduced by reducing the number of transmissions according to the priority. Alternatively, the integrated data may be generated as a data frame for transmission in which the pieces of detection data from the detectors 31, 32, and 33 are combined in data amounts according to their priorities. By reflecting the priorities, for example, as shown in FIG. 8, integrated data is generated in which the proportions of the detection data from the front detectors 31F, 32F, and 33F and the detection data from the right detectors 31R, 32R, and 33R are large. For comparison, FIG. 8 shows the proportion of the detection data from each of the detector groups at different arrangement positions in the integrated data generated before reflecting the priorities, that is, when the priorities are not reflected. A decrease in the proportion in the integrated data is realized by reducing the volume of the detection data output from each of the detectors 31, 32, and 33, for example, by reducing the volume by thinning out the data such as reducing the number of detection points or reducing the resolution, or by reducing the frequency of detection data transmission. The integrated data generation part 200 transmits the integrated data to the driving support control device 40 via the output part 204 (step S106), and the processing routine ends. Note that, in a case where a common data format is used between the data processing device 21 and the vehicle control device 40, the generation of integrated data by the integrated data generation part 200 may include, in addition to allocating the amount of data for transmission, integration processing such as format conversion into the common data format and frame rate integration.

Figure 9:
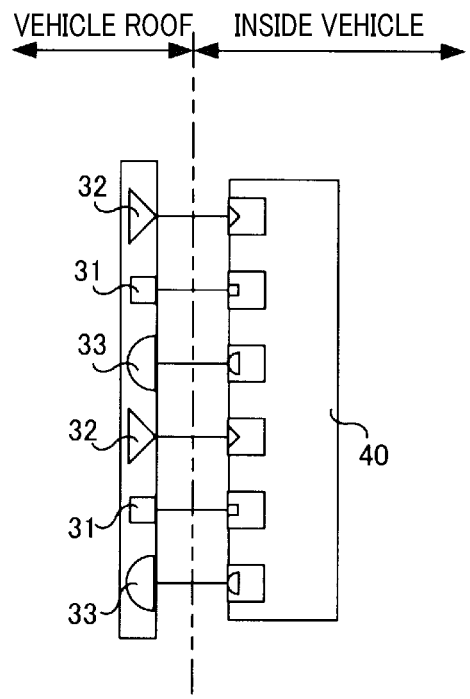
FIG. 9 is an explanatory diagram showing how a measuring device unit according to a conventional example is connected to the driving support control device.

As described above, according to the measuring device unit 10 according to the first embodiment, the data processing device 21 includes the plurality of input parts 203 each connected to a different one of the plurality of detectors 31, 32, and 33. The integrated data generation part 200 generates integrated data using the detection data from the plurality of detectors 31, 32, and 33 input via the plurality of input parts 203, and transmits the integrated data to the driving support control device 40 in the vehicle 50 via the output part 204. As compared with a conventional measuring device unit in which the detectors 31, 32, and 33 are directly wired to the driving support control device 40 as shown in FIG. 9, even when a large number of detectors are integrated into a measuring device unit and mounted on a vehicle, the number of wires between the detectors and the driving support control device provided in the vehicle can be reduced, and the wiring design can be facilitated. Further, since the number of wires from the outside of the vehicle 50 to the inside of the vehicle 50 is reduced, the number of waterproof points at the boundary between the outside and inside of the vehicle 50 can be reduced. This facilitates waterproofing.

According to the measuring device unit 10 according to the first embodiment, the priorities of the amounts of data from the detectors 31, 32, and 33 allocated in the integrated data, that is, the allocated amounts of data are determined according to the driving state of the vehicle 50 and the arrangement position of the detector 31, 32, or 33. Therefore, it is possible to preferentially transmit the detection data of detectors related to a driving support that is likely to be performed by the driving support control device 40 in the traveling vehicle 50. As a result, it becomes possible to prevent or suppress loss or delayed transmission of necessary data due to excessive use of the communication band by transmission with no consideration to the priorities. This improves the accuracy and timeliness of the driving support control by the driving support control device 40.

Figure 10:
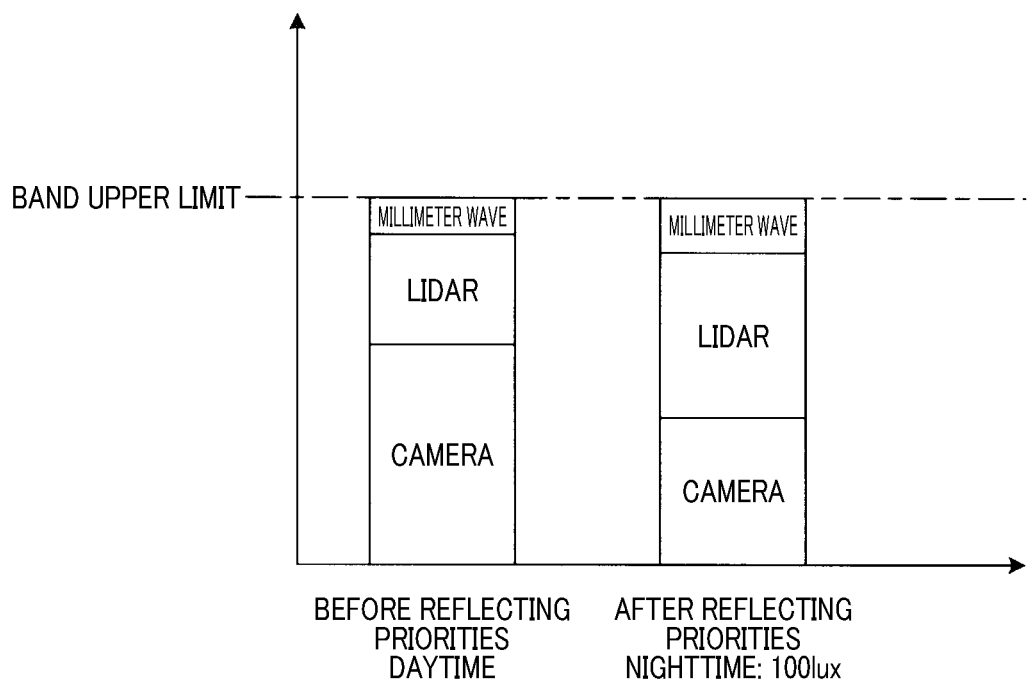
FIG. 10 is an explanatory diagram showing an example of communication band allocation in the integrated data according to priorities determined based on the environment around the vehicle.
Figures 11, 12:
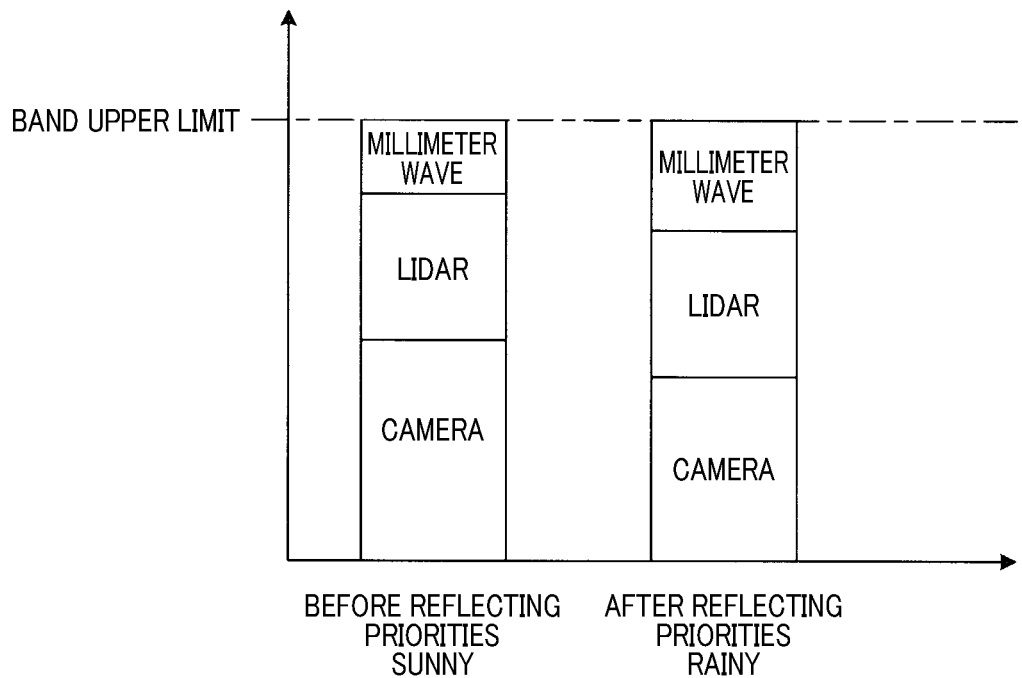
FIG. 11 is an explanatory diagram showing an example of a priority table used to determine priorities according to the brightness environment.
FIG. 12 is an explanatory diagram showing an example of communication band allocation in the integrated data according to priorities determined based on the environment around the vehicle.

In the above description, priority determination according to the arrangement positions of the detectors 31, 32, and 33 and the driving state of the vehicle has been described. It is also possible to determine the priorities according to the type of the detectors 31, 32, and 33, according to the environment information around the vehicle 50. FIG. 10 shows an example of the ratio of the detection data in the integrated data generated when the priorities are determined according to the brightness environment around the vehicle 50 obtained by an illuminance sensor as the ambient environment. More specifically, it shows the priority allocation in a case where a plurality of detectors are provided for each of the three types of detectors, namely. the camera 31, lidar 32, and radar 33. In FIG. 10, "before reflecting priorities" is, for example, daytime, and "after reflecting priorities" is, for example, nighttime. "Nighttime" means an ambient light condition where the illuminance obtained by the illuminance sensor has a value lower than a predetermined illuminance, for example, 100 lux. In general, during the nighttime or in a dark place, since the resolution of the light receiving type (passive type) detectors 31, that is, the cameras becomes low, the light emitting/light receiving type (active type) detectors 32 which are unsusceptible to ambient light, that is, the lidars, and the detectors 33 which are unsusceptible to ambient light, that is, the millimeter wave radars are given higher priority. As a result, as shown in FIG. 11, in the evening, the amount of detection data of the detectors 32 in the integrated data is slightly increased and the amount of detection data of the detectors 31 is slightly reduced as compared with those in the daytime. During the nighttime, the amount of detection data of the detectors 32 in the integrated data is increased, the amount of detection data of the detectors 33 is slightly increased, and the amount of detection data of the detectors 31 is reduced as compared with those in the daytime or in the evening. By increasing or slightly increasing the proportions of the detection data from the detectors 32 and the detection data from the detectors 33 from those in the daytime or in the evening, the accuracy and timeliness of the driving support control in the driving support control device 40 can be improved. Note that, in the example of FIG. 10, the arrangement positions of the detectors 31, 32, and 33 are not reflected in the priorities. Further, in FIG. 11, for example, an illuminance of 1000 lux corresponds to the ambient light at sunset, 100 lux corresponds to the ambient light when nighttime street lights are on, and 1 lux corresponds to the ambient light with no nighttime street lights. Intermediate values between the proportions shown in FIG. 11 may be used according to the output illuminance value of the illuminance sensor.

FIG. 12 shows an example of the ratio of the detection data in the integrated data generated when the priorities are determined according to the weather environment around the vehicle 50 obtained by a rain sensor as the ambient environment. In FIG. 12, "before reflecting priorities" is, for example, when the weather is sunny, and "after reflecting priorities" is, for example, when it is raining, foggy, or snowing. "It is raining" or "snowing" refers to a weather condition where raindrops or snow is detected by the rain sensor. Since the configuration and principle of the rain sensor are already known, the description thereof will be omitted. In general, when it is raining, snowing, or foggy, the resolution of the optical detectors 31 and 32 becomes lower than that of the radio wave detectors 33 which are unsusceptible to attenuation due to raindrops, snowflakes, or water vapor, that is, the radars. Therefore, the radars are given higher priority. FIG. 13 shows examples of the priorities, that is, an example of the ratio of the amounts of data from the detectors 31, 32, and 33 in the integrated data. When it is raining but the rainfall is less than 1 mm/h, the detection accuracy of the detectors 31 and 32 is not affected by the raindrops, so a ratio similar to that when the weather is sunny is set. On the other hand, when it is raining and the rainfall is 1 mm/h or higher and lower than 15 mm/h, or 15 mm/h or higher, the amount of detection data of the detectors 33 in the integrated data is increased and the amounts of detection data of the detectors 31 and 32 are reduced as compared with those when the weather is sunny. In particular, when it is raining and the rainfall is 15 mm/h or higher, the proportion of the amount of data from the detectors 33 is increased to four times that in sunny weather. In the case of foggy weather where diffuse reflection of light tends to occur, a ratio similar to that when it is raining and the rainfall is 15 mm/h or higher is applied, and when it is snowing, a ratio similar to that when it is raining and the rainfall is 1 mm/h or higher and lower than 15 mm/h is applied. A ratio similar to that when it is raining and the rainfall is 15 mm/h or higher may be applied in snowy weather depending on the snowfall. Intermediate values between the proportions shown in FIG. 13 may be used according to the output value of the rain sensor or the like. By increasing the proportion of the detection data from the detectors 33 in non-sunny weather from that in sunny weather, the accuracy and timeliness of the driving support control in the driving support control device 40 can be improved. Note that, in the example of FIG. 12, the arrangement positions of the detectors 31, 32, and 33 are not reflected in the priorities. The weather condition such as foggy or snowy may be acquired by using, for example, regional weather information provided through various kinds of road-to-vehicle communication and vehicle-to-vehicle communication. As shown in FIG. 14, the priorities, that is, the ratio of the amounts of data from the detectors 31, 32, and 33 in the integrated data may be set by considering the brightness environment and the weather environment in a combined manner. By considering a plurality of environments as the environment information around the vehicle 50, the accuracy and timeliness of the driving support control in the driving support control device 40 can be further improved.

Figure 15:
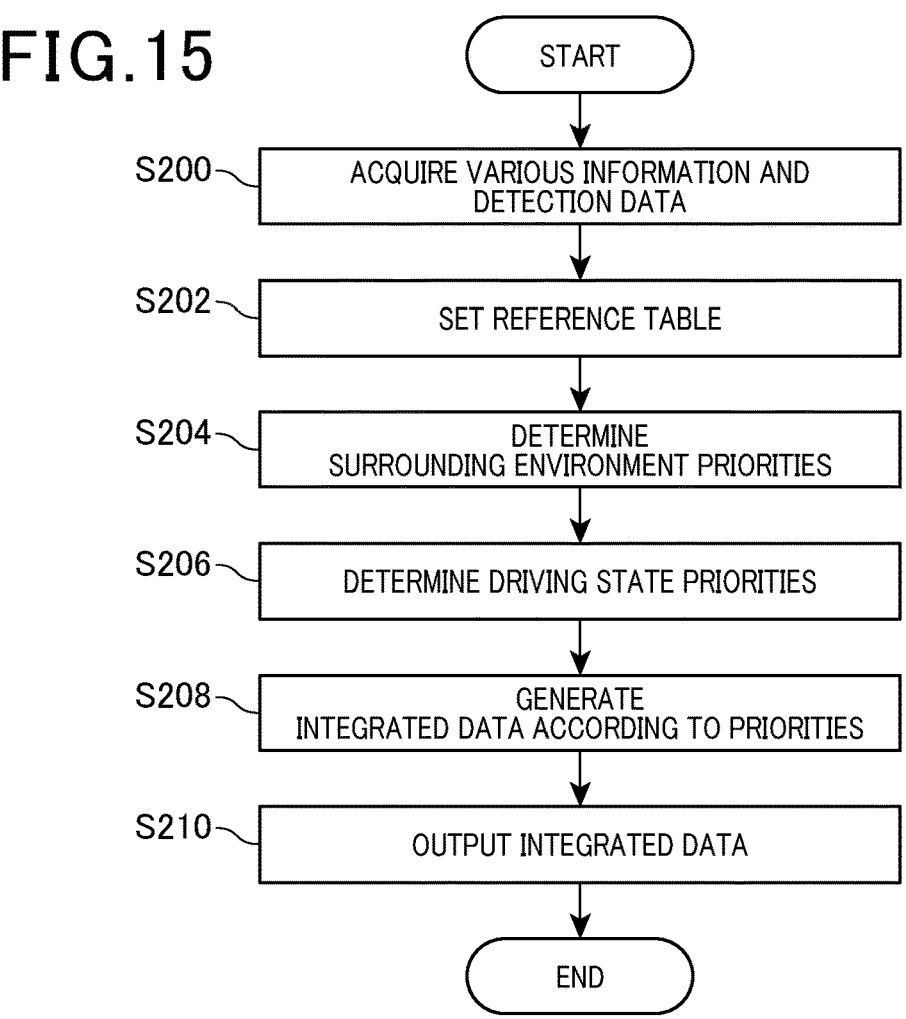
FIG. 15 is a flowchart showing another processing flow of integrated data generation carried out by the data processing device according to the first embodiment.

In the examples shown in FIGS. 10 to 14, the arrangement positions of the detectors 31, 32, and 33 may also be taken into consideration in the priority determination. The priorities of the detection data from the detectors in the integrated data, that is, their ratio may be determined by considering the environment information such as ambient brightness and weather together with the driving information of the vehicle 50, and using the arrangement positions of the detectors and their types. In this case, since integrated data containing detection data from the detectors in a ratio that is in accordance with the driving information of the vehicle 50 and the vehicle environment information, the accuracy and timeliness of the driving support control in the driving support control device 40 can be further improved. Further, the priorities of the detection data from the detectors 31, 32, and 33 may be determined according to a dynamic request from the driving support control device 40 while the vehicle 50 is moving. In this case, since the detection data corresponding to the driving support to be carried out by the driving support control device 40 can be preferentially transmitted to the driving support control device 40, the driving support can be carried out with even higher accuracy and timeliness in the driving support control device 40. This suppresses the transmission of unnecessary detection data and allows the communication band for the integrated data to have some extra room. With reference to FIG. 15, the integrated data generation processing performed by the data processing device 21 in a case where the surrounding environment information of the vehicle 50 is taken into consideration together with the arrangement positions of the detectors 31, 32, and 33 and the driving information of the vehicle 50 will be described. The processing routine shown in FIG. 15 is, for example, repeated at predetermined time intervals, for example, intervals of several milliseconds from the start to the stop of the vehicle control system, or from when the start switch is turned on to when the start switch is turned off. The processing steps described with reference to FIG. 5 will only be described briefly.

The integrated data generation part 200 acquires detection data from each of the detectors 31, 32, and 33 via the detector input part 203 (step S200). The priority determining part 201 determines a reference table corresponding to the environment information around the vehicle 50 (step S202). For example, the reference tables are the reference tables shown in FIGS. 11, 13, and 14, and, depending on the types of sensors the vehicle 50 is provided with to acquire the vehicle environment information, a reference table corresponding to at least one of the brightness environment and the weather environment can be determined. The reference tables shown in FIGS. 11, 13, and 14 may be, for example, provided in the priority determining part 201 or stored in the memory 202. The priority determining part 201 determines the surrounding environment priorities using the vehicle environment information acquired from the vehicle CAN 55 via the information input part 205, and the determined reference table (step S204). The surrounding environment priorities are determined following the determination procedures described with reference to FIGS. 10 to 13 using the illuminance, the weather condition, and/or the like as parameters. The priority determining part 201 determines the driving state priorities using various information such as the driving information and vehicle environment information acquired from the vehicle CAN 55 via the information input part 205, and the detector arrangement information DI stored in the memory 202 (step S206).

Figures 5, 6:
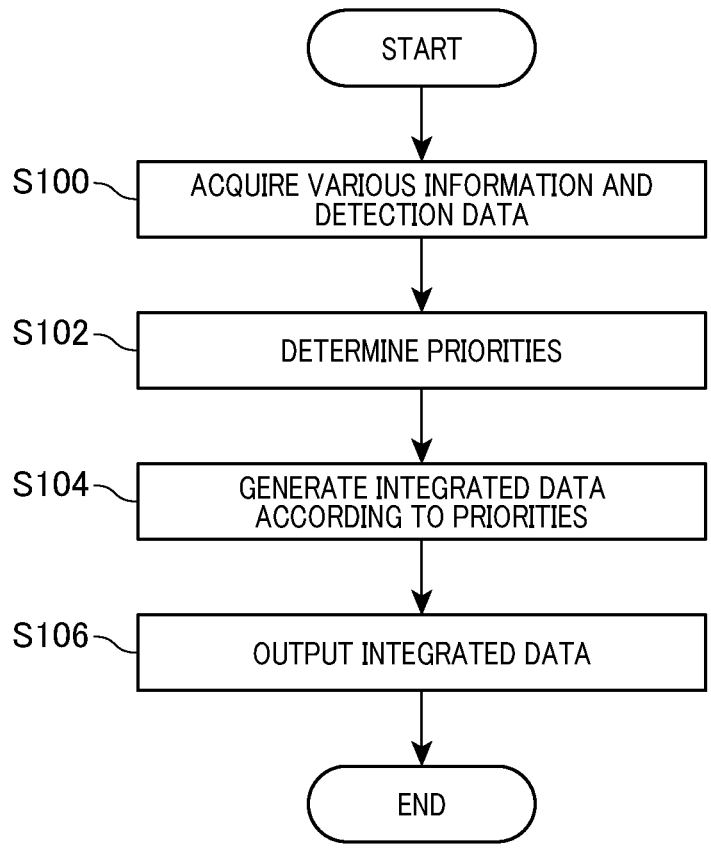
FIG. 5 is a flowchart showing a processing flow of integrated data generation carried out by the data processing device according to the first embodiment.
FIG. 6 is an explanatory diagram showing an example of a priority table used to determine priorities according to the driving state.

The integrated data generation part 200 generates the integrated data according to the determined surrounding environment priorities and driving state priorities (step S208). More specifically, it is determined by multiplying the proportion for the determined surrounding environment priority of each detector 31, 32, or 33 by the proportion for the determined driving state priority of that detector 31, 32, or 33. For example, as shown in FIG. 6, when the vehicle is turning right, the amount of data from the right detectors 31R, 32R, and 33R takes up 40% of the band, and, as shown in FIG. 14, when the environment around the vehicle is sunny and daytime, the amount of data of the camera 31 takes up 60% of the band. Accordingly, 24% of the band is allocated to the camera 31R as a right detector. The integrated data generation part 200 transmits the integrated data to the driving support control device 40 via the output part 204 (step S210), and the processing routine ends. In the present embodiment, a case where one camera 31R, one lidar 32R, and one radar 33R are provided as the right detectors is described as an example. However, for example, when two cameras 31R, one lidar 32R, and one radar 33R are provided, the allocation to the detectors 31, 32, and 33 may be changed so as not to exceed the upper limit of the band, considering the band required for each detector.

Second Embodiment

Figure 16:
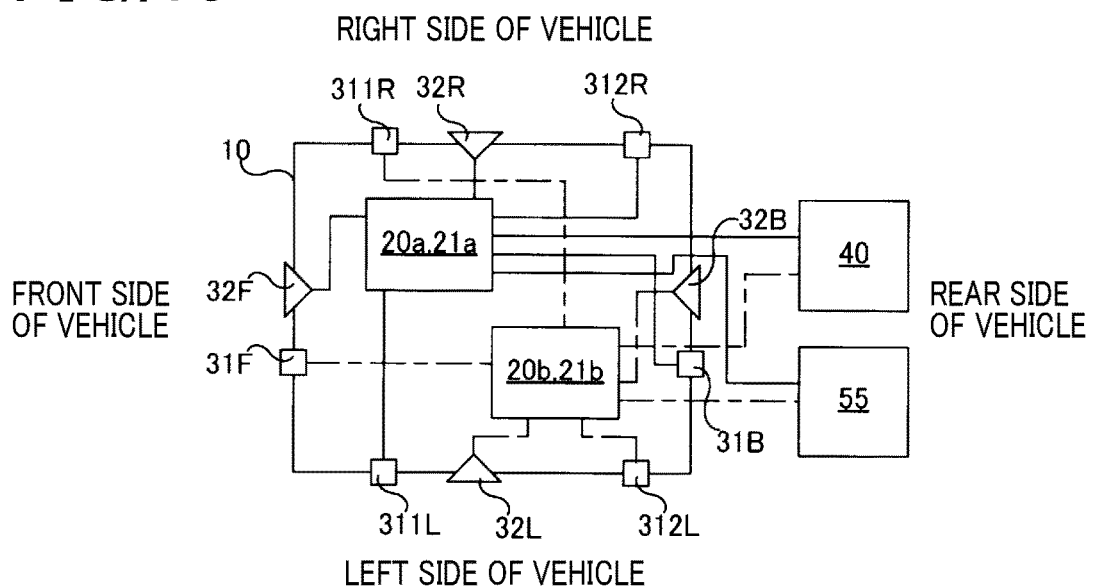
FIG. 16 is an explanatory diagram schematically showing a connection example between a data processing device according to a second embodiment and detectors.

The measuring device unit 10 according to the first embodiment included one data processing device 21, but the measuring device unit 10 according to the second embodiment includes data processing devices 21a and 21b housed in two bodies 20a and 20b as shown in FIG. 16. Since the configurations and functions of the devices and equipment including the data processing devices 21a and 21b have already been described in the first embodiment, the description thereof will be omitted by denoting them by the same reference signs as those used in the first embodiment.

In the example of FIG. 16, a plurality of detectors 31, 32, and 33 arranged in the same direction of the vehicle 50 are connected to different data processing devices 21a, 21b. Further, different types of detectors are connected to different data processing devices 21a and 21b. This ensures redundancy, and even if one of the data processing devices 21a and 21b fails or malfunctions, it is possible to continue transmitting integrated data containing a plurality of types of detection data to the driving support control device 40. The vehicle 50 can continue traveling under the driving support control including autonomous driving, or shift to limp mode. Further, since the data processing devices 21a and 21b are connected to the driving support control device 40, the communication band can be doubled. Larger amounts of detection data from the detectors 31, 32, and 33 indicated in the integrated data can be allocated in the integrated data, and the decreases in the proportions of low priority detection data can be suppressed. For example, the amount of detection data output by the cameras 31 is larger than those of the lidars 32 and the radars 33, but by distributing the number of connected cameras between the data processing devices 21a and 21b, the communication band for the integrated data can have some extra room, and the reduction in the amounts of low priority detection data can be suppressed. Further, the number of detectors 31, 32, and 33 installed can be increased while guaranteeing the minimum data amount for each detection data.

In the example of FIG. 16, different types of detectors are connected to different data processing devices 21a and 21b to provide redundancy with regard to the detector type. However, detectors of the same type may be connected to the same data processing device 21a or 21b to provide redundancy with regard to the detector arrangement positions. Further, by arranging a plurality of detectors of the same type in each direction of the vehicle 50 and connecting the detectors of the same type to different data processing devices 21a and 21b, the redundancy regarding the detector arrangement positions may be further improved.

Other Embodiments (1) In the above embodiments, examples have been described in which the measuring device unit 10 is connected to the driving support control device 40 in the vehicle 50 as the vehicle control device 40. However, the vehicle control device 40 is not limited to the driving support control device 40, and it may be any of various control devices such as a vehicle control device, and a communication gateway control device in an in-vehicle network. In any case, the advantage that the number of wires from the outside of the vehicle 50 to the inside of the vehicle 50 can be reduced can be obtained.

(2) In the above embodiments, the integrated data generation processing is realized by a pre-programmed integrated circuit such as FPGA or ASIC. However, the integrated data generation processing may be implemented in software by the CPU executing an integrated data generation program, or implemented in hardware by a discrete circuit. That is, the control parts of the above embodiments and their methods may be realized using a dedicated computer provided by configuring a processor and a memory programmed to execute one or more functions embodied by computer programs. Alternatively, the control parts and their methods described herein may be realized using a dedicated computer provided by configuring a processor with one or more dedicated hardware logic circuits. Alternatively, the control parts and their methods described herein may be realized using one or more dedicated computers configured by combining a processor and a memory programmed to execute one or more functions with a processor configured using one or more hardware logic circuits. The computer programs may be stored in a computer-readable, non-transitional tangible recording medium as instructions executed by the computer.

Although the present disclosure has been described above based on embodiments and modifications, the above-described implementations of the present invention are for facilitating the understanding of the present disclosure and do not limit the present disclosure. The present disclosure may be modified or improved without departing from the spirit thereof and the claims, and the present disclosure includes equivalents thereof. For example, the technical features of the embodiments and modifications corresponding to the technical features of the modes described in "Summary of the Invention" may be replaced or combined as appropriate to solve part or all of the above-described problems, or achieve part or all of the above-described effects. When a technical feature is not described as an essential feature herein, it can be removed as appropriate.

What is claimed is:

1. A vehicle measuring device unit comprising:
a plurality of detectors; and
a data processing device including
a plurality of input parts each connected to a different one of the plurality of detectors,
an output part connected to a control device provided in a vehicle, and
an integrated data generation part that generates integrated data using detection data input from the plurality of detectors via the plurality of input parts and outputs the generated integrated data via the output part,
wherein
a number of wires connecting the control device with the integrated data generation part is smaller than a number of wires connecting the integrated data generation part with the plurality of detectors,
the data processing device determines a priority of detection data from each of the detectors by using at least one of vehicle environment information, vehicle driving information, and arrangement information of the plurality of detectors, and generates the integrated data according to the determined priorities, and
the integrated data is generated by adjusting relative proportions of respective detection data transmitted from each of the plurality of detectors relative to a total amount of detection data of the integrated data according to the determined priorities.

2. The vehicle measuring device unit according to claim 1, wherein
the plurality of detectors include a plurality of detectors of different types.

3. The vehicle measuring device unit according to claim 1, further comprising
a body housing the data processing device, wherein
the plurality of detectors are arranged around the body.

4. The vehicle measuring device unit according to claim 1, wherein
the data processing device makes an amount of high priority detection data larger than an amount of the other detection data in the integrated data.

5. The vehicle measuring device unit according to claim 1, wherein
the data processing device outputs high priority detection data more frequently than the other detection data as the integrated data.

6. The vehicle measuring device unit according to claim 1, wherein
the integrated data generation part determines the priorities by using the vehicle driving information and the arrangement information of the plurality of detectors.

7. The vehicle measuring device unit according to claim 1, wherein
the integrated data generation part determines the priorities by using the vehicle environment information and according to a type of detection data from each of the detectors.

8. The vehicle measuring device unit according to claim 1, wherein
the integrated data generation part determines the priorities according to detection data from the detectors that is dynamically requested in the control device.

9. A method of generating integrated data in a vehicle measuring device unit, comprising:
receiving detection data from a plurality of detectors;
generating the integrated data using a plurality of the pieces of detection data; and
transmitting the integrated data to a control device provided in the vehicle, a number of wires connecting the control device with an integrated data generation part that is provided in the measuring device unit and generates the integrated data being smaller than a number of wires connecting the integrated data generation part with the plurality of detectors, wherein
a priority of detection data is determined from each of the detectors by using at least one of vehicle environment information, vehicle driving information, and arrangement information of the plurality of detectors, and the integrated data is generated according to the determined priorities,
the integrated data is generated by adjusting relative proportions of respective detection data transmitted from each of the plurality of detectors relative to a total amount of detection data of the integrated data according to the determined priorities.

* * * * *